US008757571B2

(12) United States Patent
Shimajiri

(10) Patent No.: US 8,757,571 B2
(45) Date of Patent: Jun. 24, 2014

(54) CUP HOLDER

(75) Inventor: Naohiro Shimajiri, Toyota (JP)

(73) Assignee: Nifco Inc., Yokohama-shi (JP)

( * ) Notice: Subject to any disclaimer, the term of this patent is extended or adjusted under 35 U.S.C. 154(b) by 269 days.

(21) Appl. No.: 13/137,590

(22) Filed: Aug. 29, 2011

(65) Prior Publication Data

US 2012/0056063 A1     Mar. 8, 2012

(30) Foreign Application Priority Data

Aug. 27, 2010   (JP) ................................. 2010-190606

(51) Int. Cl.
*B60N 3/10*          (2006.01)

(52) U.S. Cl.
USPC .......................... 248/311.2; 224/282; 224/926

(58) Field of Classification Search
CPC ........................................................ B60N 3/10
USPC ........... 248/311.2, 312, 312.1, 102, 103, 106;
224/281, 282, 926; 220/737, 738, 507,
220/500, 810, 830, 827, 23.89, 23.87, 23.86
See application file for complete search history.

(56) References Cited

U.S. PATENT DOCUMENTS

| 5,190,259 | A | * | 3/1993 | Okazaki ...................... 248/311.2 |
| 5,342,009 | A | * | 8/1994 | Lehner ........................ 248/311.2 |
| 5,520,313 | A | * | 5/1996 | Toshihide ...................... 224/539 |
| 5,845,888 | A | * | 12/1998 | Anderson ................... 248/311.2 |
| 5,997,082 | A | * | 12/1999 | Vincent et al. ........... 297/188.19 |
| 6,409,136 | B1 | * | 6/2002 | Weiss et al. ................. 248/311.2 |
| 6,427,960 | B1 | * | 8/2002 | Gehring et al. ............. 248/311.2 |
| 6,655,563 | B2 | * | 12/2003 | Shimajiri ....................... 224/282 |
| 6,705,579 | B2 | * | 3/2004 | Yamada ....................... 248/311.2 |
| 6,715,727 | B2 | * | 4/2004 | Sambonmatsu ........... 248/311.2 |
| 6,779,769 | B1 | * | 8/2004 | York et al. .................. 248/311.2 |
| 6,837,471 | B2 | * | 1/2005 | Izume ........................ 248/311.2 |
| 6,932,311 | B2 | * | 8/2005 | DeVries et al. ............. 248/311.2 |
| 7,131,690 | B2 | * | 11/2006 | Bollaender et al. ...... 297/188.17 |
| 7,226,029 | B2 | * | 6/2007 | Hoshi ......................... 248/311.2 |
| 7,300,031 | B2 | * | 11/2007 | Bertsch et al. ............. 248/311.2 |

(Continued)

FOREIGN PATENT DOCUMENTS

| CN | 2393748 Y | | 8/2000 | |
| CN | 1572187 A | | 2/2005 | |
| JP | 2002337595 A | * | 11/2002 | ............... B60N 3/10 |
| JP | 2010137761 A | * | 6/2010 | |

OTHER PUBLICATIONS

China Patent Office, Office Action for CN 201110253943.1, Sep. 29, 2013.

*Primary Examiner* — Jonathan Liu
*Assistant Examiner* — Guang H Guan
(74) *Attorney, Agent, or Firm* — Manabu Kanesaka

(57) ABSTRACT

A cup holder includes a case main body defining a housing chamber; a lid member rotatably attached to the case main body between a closed position closing the opening portion and an open position opening the opening portion; a cup retaining member; and a parallel link mechanism connecting the case main body and the cup retaining member. A connecting mechanism connects the lid member and the cup retaining member so as to interconnect together so that the cup retaining member ascends to the ascent position from a descent position, and the cup retaining member descends from the ascent position to the descent position. Stopper abutting portions are provided in the cup retaining member and the lid member to control a downward movement of the cup retaining member.

3 Claims, 6 Drawing Sheets

(56) References Cited

U.S. PATENT DOCUMENTS

| | | | |
|---|---|---|---|
| 7,481,343 B2 * | 1/2009 | Misumi | 224/282 |
| 7,621,419 B2 * | 11/2009 | Fukuo | 220/264 |
| 2003/0071047 A1 * | 4/2003 | Harada | 220/835 |
| 2011/0259906 A1 * | 10/2011 | Shimajiri | 220/737 |
| 2012/0056063 A1 * | 3/2012 | Shimajiri | 248/311.2 |

\* cited by examiner

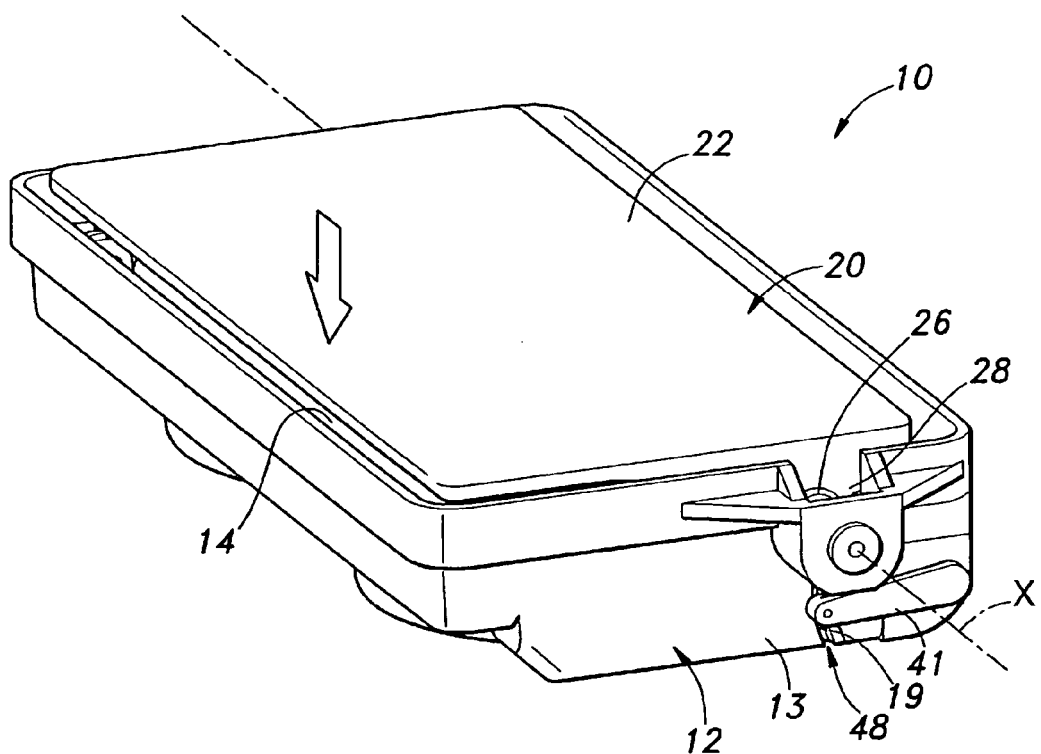
Fig. 1
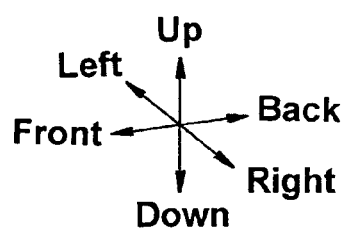

CUP HOLDER

CROSS-REFERENCE TO RELATED APPLICATIONS

The application claims a priority of Japanese Patent Application No. 2010-190606 filed on Aug. 27, 2010, a disclosure of which is incorporated herein.

BACKGROUND OF THE INVENTION AND RELATED ART STATEMENT

The present invention relates to a cup holder provided in an interior of a vehicle such as an automobile and the like, and especially, relates to a cup holder of a type wherein a cup retaining member is popped up by interconnecting with opening and closing operations of a lid member.

As a cup holder disposed inside the interior of the vehicle such as the automobile and the like, and retaining a cup, aluminum beverage can, plastic bottle, and the like so as not to be tipped over, a pop-up type is well-known. The pop-up type includes a case main body defining a housing chamber including an opening portion on an upper side; a lid member rotatably attached to the case main body between a closed position closing the opening portion and an open position opening the opening portion; a cup retaining member including a cup-retaining shape portion; a parallel link mechanism connecting the case main body and the cup retaining member, and movably retaining the cup retaining member between a descent position inside the housing chamber and an ascent position on an upper side of the opening portion; and connecting mechanisms connecting the lid member and the cup retaining member so as to be capable of interconnecting, allowing the cup retaining member to ascend and move to the ascent position from the descent position by a movement of the lid member from the closed position to the open position, and allowing the cup retaining member to descend and move from the ascent position to the descent position by a movement of the lid member from the open position to the closed position (for example, see Japanese Unexamined Patent Application Publication No. 2010-137761: Patent Document 1).

In the pop-up-type cup holder as mentioned above, when a hand, plastic bottle, or the like touches the cup retaining member which is in the ascent position so that a load pushing down the cup retaining member acts on the cup retaining member, the cup retaining member descends unexpectedly. Consequently, cup retention by the cup retaining member becomes unstable. Also, in a state wherein the cup retaining member retains the cup, when the load pushing down the cup retaining member acts on the cup retaining member, the cup is sandwiched between the cup retaining member and the lid member, and the cup retaining member is prevented from descending, so that an excessive load acts on the cup retaining member. Consequently, the cup retaining member may be damaged.

Especially, the parallel link mechanism connecting the case main body and the cup retaining member is structured by a right-and-left pair of first link members whose one end is respectively connected to both right-and-left side portions of the cup retaining member so as to be capable of rotating around an axis line extending in a right-and-left direction, and whose other end is respectively rotatably connected to the case main body; and a second link member with a length equal to the first link members whose one end is connected to an intermediate portion of the right-and-left direction of the cup retaining member in a position which differs in a front-back direction from a connecting position between the cup retaining member and the first link members so as to be capable of rotating around the axis line extending in the right-and-left direction, and whose other end is rotatably connected to the case main body. In the parallel link mechanism wherein a rotating face (plane surface perpendicular to a rotating axis line) of the first link members and a rotating face of the second link member are not located on the same plane surface, and are located in a position which differs in an axis line direction, when the load pushing down the cup retaining member acts on the cup retaining member, the cup retaining member is easily deformed by being twisted as a twisting axis line of the right-and-left direction, and due to a twisting deformation, right-and-left end portions of the cup retaining member easily descend in such a way as to "bow down". Consequently, the cup retention by the cup retaining member easily becomes unstable.

An object of the present invention is to provide a pop-up-type cup holder which prevents the cup retention by the cup retaining member from becoming unstable due to an unexpected descending movement or the twisting deformation of the cup retaining member. Also, the pop-up-type cup holder prevents the cup retaining member from being damaged by an action of an excessive pushing-down load on the cup retaining member.

Further objects and advantages of the invention will be apparent from the following description of the invention.

SUMMARY OF THE INVENTION

A cup holder according to the present invention includes a case main body defining a housing chamber including an opening portion on an upper side; a lid member rotatably attached to the case main body between a closed position closing the opening portion and an open position opening the opening portion; a cup retaining member including a cup-retaining shape portion; a parallel link mechanism connecting the case main body and the cup retaining member, and movably retaining the cup retaining member between a descent position inside the housing chamber and an ascent position on an upper side of the opening portion; connecting mechanisms connecting the lid member and the cup retaining member so as to be capable of interconnecting, allowing the cup retaining member to ascend and move to the ascent position from the descent position by a movement of the lid member from the closed position to the open position, and allowing the cup retaining member to descend and move from the ascent position to the descent position by a movement of the lid member from the open position to the closed position; and stopper abutting portions provided in the cup retaining member and the lid member, controlling a downward movement of the cup retaining member by mutually abutting in a case when a pushing-down load acting on the cup retaining member has less than a predetermined value in a state wherein the lid member is in the open position, and allowing the downward movement of the cup retaining member by being disengaged from an abutting state controlling the downward movement in a case when the pushing-down load has the predetermined value or above in the state wherein the lid member is in the open position.

According to the structure, in the state wherein the lid member is in the open position, in a case when the pushing-down load which is less than the predetermined value acts on the cup retaining member which is in the ascent position, the stopper abutting portions provided in the cup retaining member and the lid member mutually abut, so that the downward movement including a twisting deformation of the cup retaining member is controlled. Thereby, cup retention by the cup retaining member is prevented from becoming unstable.

On the other hand, in the state wherein the lid member is in the open position, when the pushing-down load which has the predetermined value or above acts on the cup retaining member which is in the ascent position, the stopper abutting portions are disengaged from the abutting state, so that the cup retaining member is allowed to move downwardly. Thereby, acting an excessive pushing-down load on the cup retaining member is prevented, so that damage on the cup retaining member is prevented.

As one embodiment, in the cup holder according to the present invention, the parallel link mechanism is structured by a right-and-left pair of first link members whose one end is respectively connected to both right-and-left side portions of the cup retaining member so as to be capable of rotating around an axis line extending in a right-and-left direction, and whose other end is respectively rotatably connected to the case main body; and a second link member with a length equal to the first link members whose one end is connected to an intermediate portion of the right-and-left direction of the cup retaining member in a position which differs in a front-back direction from a connecting position between the cup retaining member and the first link members so as to be capable of rotating around the axis line extending in the right-and-left direction, and whose other end is rotatably connected to the case main body.

Thus, in the parallel link mechanism wherein the front and back link members are provided in different streaks in an axis direction, the cup retaining member is easily deformed by being twisted as a twisting axis line of the right-and-left direction, and the cup retention by the cup retaining member tends to become unstable. However, this can be effectively prevented by an operation of the stopper abutting portions.

Preferably, in the cup holder according to the present invention, the first link member is connected to the cup retaining member in a front side portion of the cup retaining member, and the second link member is connected to the cup retaining member in a back side portion of the cup retaining member. Also, the connecting mechanisms are structured by a long groove portion which is long in a horizontal direction and respectively provided on the back side portion on both right and left sides of the cup retaining member, and a convex portion which is respectively provided on both right and left sides of the lid member, and slidably engaged with the long groove portion.

According to the structure, locations of the parallel link mechanism and the connecting mechanisms never overlap position-wise so as to provide an advantage space-wide, so that an assembly operation never becomes troublesome.

Preferably, in the cup holder according to the present invention, the cup-retaining shape portion of the cup retaining member has a semicircular shape in which a standing side of the lid member is open. Further, the cup holder according to the present invention includes an auxiliary cup retaining member provided on a front face of the standing lid member so as to be capable of rotating in an up-and-down direction. The auxiliary cup retaining member protrudes to a cup-retaining shape portion side by being urged by a spring in an upper direction, and is pushed down against urging of the spring by a cup inserted into the cup-retaining shape portion.

According to the structure, the cup retaining member is easily twisted and deformed shape-wise. However, a cup and a plastic bottle with large and small various sizes can be stably retained.

Preferably, the cup holder according to the present invention further includes spring means urging the lid member in the open position, and lock means selectively retaining the lid member in the closed position.

According to the structure, only by releasing the lock means, due to a spring force of the spring means, the lid member is positioned in the open position so as to improve usability.

According to the cup holder according to the present invention, in the state wherein the lid member is in the open position, in a case when the pushing-down load having less than the predetermined value acts on the cup retaining member which is in the ascent position, i.e., in a case when a hand, plastic bottle, or the like slightly touches the cup retaining member, the stopper abutting portions provided in the cup retaining member and the lid member mutually abut, so that the downward movement including the twisting deformation of the cup retaining member is controlled. Thereby, the cup retention by the cup retaining member is prevented from becoming unstable.

On the other hand, in the state wherein the lid member is in the open position, when the pushing-down load which has the predetermined value or above acts on the cup retaining member which is in the ascent position, i.e., in a case when a hand, plastic bottle, or the like strongly touches the cup retaining member, the stopper abutting portions are disengaged from the abutting state, so that the cup retaining member is allowed to move downwardly. Thereby, acting the excessive pushing-down load on the cup retaining member is prevented, so that the damage on the cup retaining member is prevented.

BRIEF DESCRIPTION OF THE DRAWINGS

FIG. 1 is a perspective view showing a closed state (housed state) of one embodiment of a cup holder according to the present invention;

DETAILED DESCRIPTION OF PREFERRED EMBODIMENTS

Figure 2:
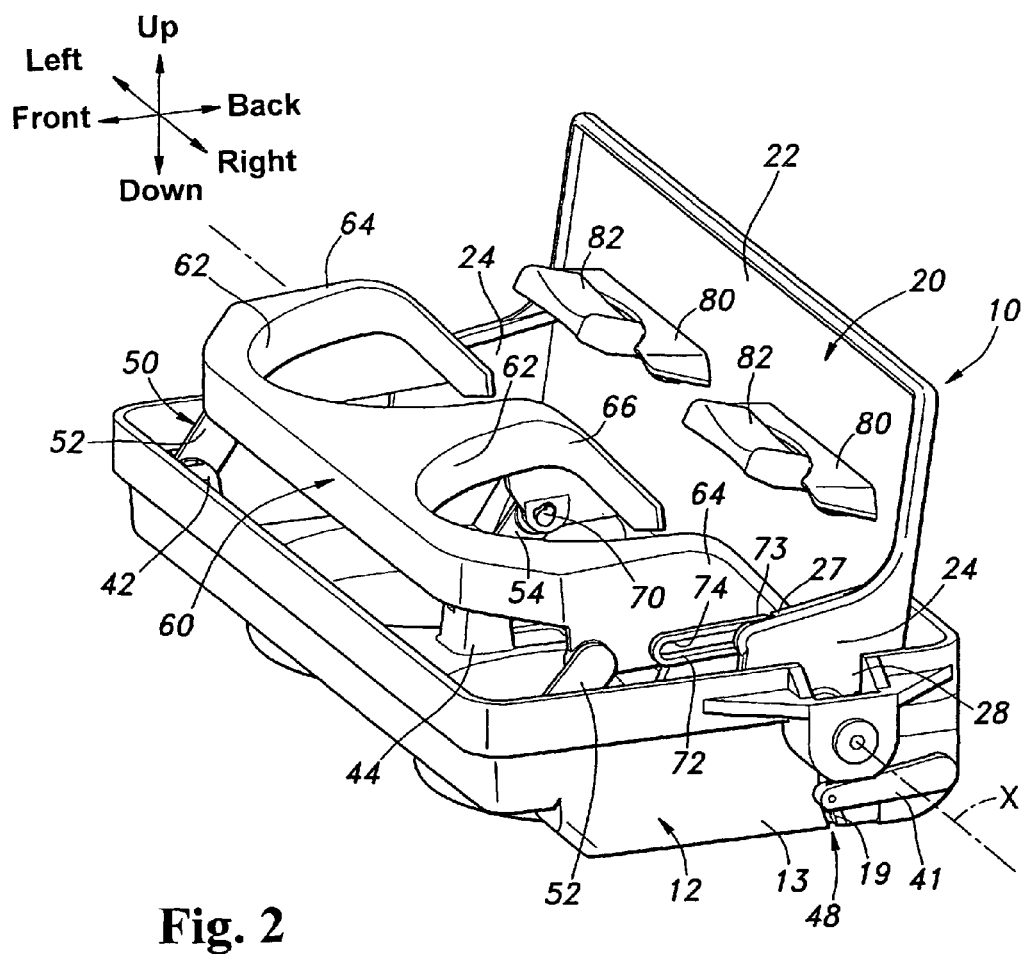
FIG. 2 is a perspective view showing an open state (usage state) of the one embodiment of the cup holder according to the present invention.
Figure 3:
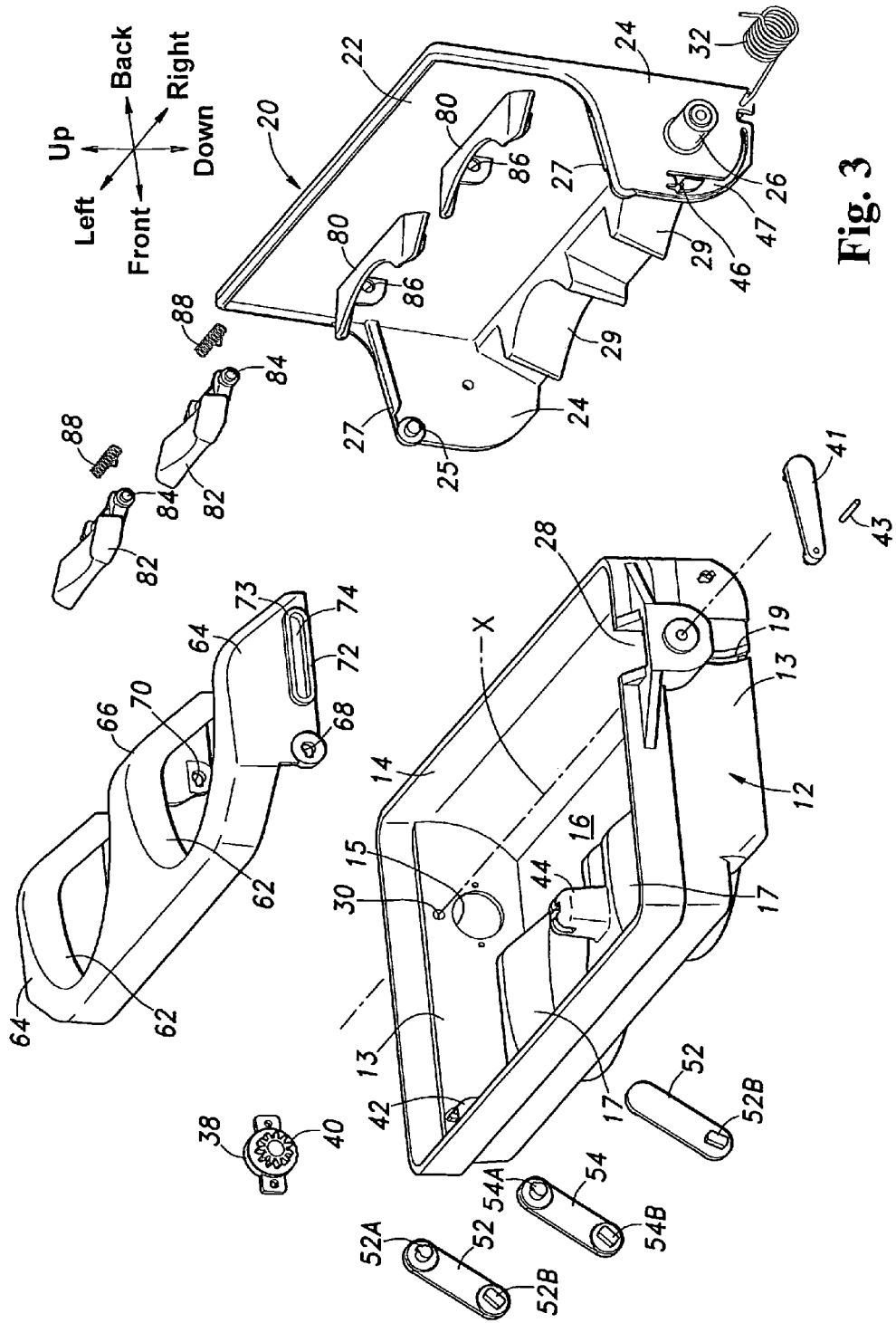
FIG. 3 is an exploded perspective view viewed from a right side of the cup holder according to the present embodiment.
Figure 4:
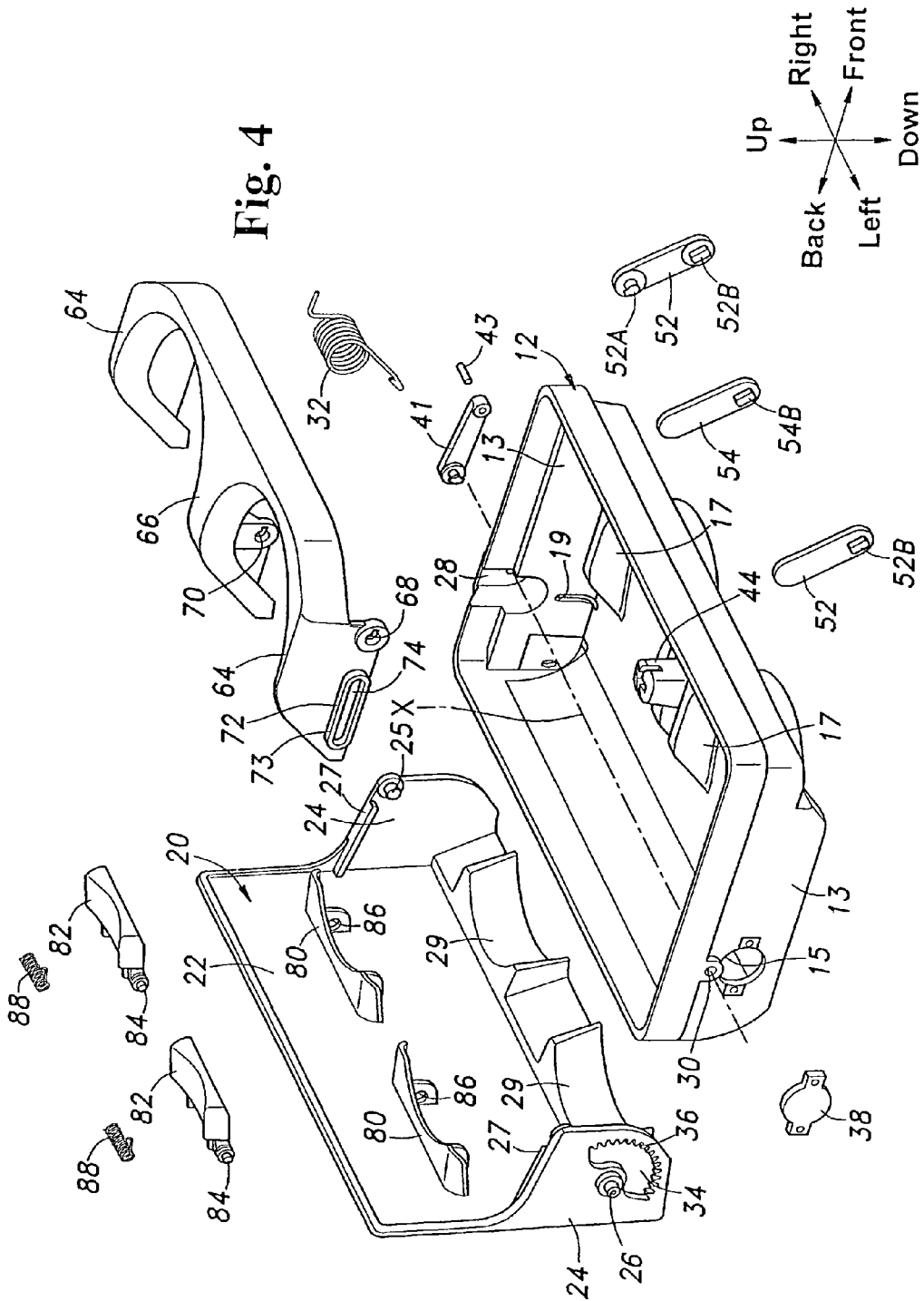
FIG. 4 is an exploded perspective view viewed from a left side of the cup holder according to the present embodiment.

One embodiment of a cup holder according to the present invention will be explained with reference to FIGS. 1 to 6(C). Incidentally, each part of the cup holder of the present embodiment is a plastic molded article unless a material is not described specifically. Also, in the after-mentioned explanation, a width direction of the cup holder is defined as a right-and-left direction, and a direction perpendicular to the right-and-left direction on the same plane surface is defined as a front-back direction.

A cup holder 10 includes a case main body 12. The case main body 12 is structured by a quadrangular box body whose upper side is open, and defines a housing chamber 16 including a quadrangular opening portion 14 on the upper side. In the case main body 12, a lid member 20 is attached so as to be capable of rotating around a central axis line X (see FIGS. 1 to 4) horizontally extending in the width direction (right-and-left direction) of the case main body 12. Next, an attachment structure of the lid member 20 will be explained.

The lid member 20 is integrally formed by a lid main body 22 with a quadrangular plate shape which is slightly smaller than the opening portion 14, and a pair of right-and-left side plate portions 24 extending forward from the lid main body 22 by being folded 90 degrees from both right-and-left end portions of the lid main body 22. Respective cylindrical axis portions 26 (see FIGS. 3 and 4) are formed in the right-and-left side plate portions 24 by respectively protruding toward an outside direction on the same axis line.

On right-and-left side wall portions 13 of the case main body 12, a bearing concave portion 28 and a bearing hole 30 (see FIGS. 3 and 4) are formed on the same axis line as the central axis line X. The right-and-left axis portions 26 of the lid member 20 rotatably engage the bearing concave portion 28 and the bearing hole 30. Thereby, the lid member 20 can rotate around the central axis line X relative to the case main body 12, and can rotate between a closed position wherein the lid member 20 falls down in a horizontal posture so as to close the opening portion 14 by the lid main portion 22 as shown in FIG. 1, and an open position wherein the lid member 20 rotates approximately 90 degrees in a clockwise direction viewed in FIG. 1 from the closed position and stands up approximately vertically so as to open the opening portion 14 as shown in FIG. 2.

Incidentally, the right-and-left side plate portions 24 of the lid member 20 are located on an inner side of the right-and-left side wall portions 13 of the case main body 12, i.e., inside the housing chamber 16.

On an outer circumference of the axis portion 26, a metallic twisting coil spring 32 is attached. In the twisting coil spring 32, one end is locked in the case main body 12, the other end is locked in the lid member 20 so as to urge the lid member 20 in the clockwise direction viewed in FIGS. 1 and 2, i.e., toward the open position.

On one of the side plate portions 24 of the lid member 20, a quarter circumferential circular opening 34 is formed concentrically with the axis portion 26. In an inner circumferential portion on a large diameter side of the circular opening 34, a sector gear 36 is formed. On an outside of one of the side wall portions 13 of the case main body 12, a viscous-damping-type rotary damper 38 is attached. The rotary damper 38 includes an input gear 40 positioned inside the housing chamber 16 by an opening 15 formed in one of the side wall portions 13. The input gear 40 engages the sector gear 36. Thereby, opening and closing of the lid member 20 are carried out at a slow speed under a damper operation of the rotary damper 38.

On an outside of the other of the side wall portions 13 of the case main body 12, a base end portion of a locking arm member 41 is fixed and placed. On an end of the locking arm member 41, a metallic engagement pin 43 is fixed. The engagement pin 43 protrudes to an inside of the housing chamber 16 by passing through a circular groove 19 formed in the side wall portion 13. On the other side plate portion 24 of the lid member 20, a locking engagement groove 47 (see FIG. 3) including a heart-shaped portion 46 is formed. The engagement pin 43 is movably engaged with the locking engagement groove 47. Thereby, a lock mechanism 48 of a heart-cam-type alternate movement is structured. The lock mechanism 48 engages the heart-shaped portion 46 of the engagement pin 43 when the lid member 20 is in the closed position so as to retain the lid member 20 in the closed position. Also, the lid member 20 in the closed position is slightly pushed, so that the lock mechanism 48 carries out a push and full open alternate movement which releases the retention.

In the case main body 12, a cup retaining member 60 is attached by a parallel link mechanism 50.

The cup retaining member 60 includes two semicircular cup-retaining shape portions 62 on right and left in parallel wherein the standing lid member 20 in a plan view, i.e., a side (back side) of the lid member 20 which is in the open position is open. Also, the cup retaining member 60 has an approximately E shape including leg-like portions 64, 66 on both right-and-left ends and in a central portion in the right-and-left direction.

On a bottom portion inside the case main body 12, as a bearing portion for the parallel link mechanism 50, bearing portions 42, 44 are respectively formed in a front portion on both right-and-left ends and in an intermediate portion of the front-back direction of the central portion in the right-and-left direction. The right-and-left bearing portions 42 and the bearing portion 44 in a center are located in positions mutually different in the front-back direction.

The parallel link mechanism 50 includes right-and-left front-side link members (first link members) 52, and a back-side link member (second link member) 54 whose length is equal to the front-side link members 52 in a location of the central portion in the right-and-left direction.

The front-side link members 52 in right-and-left locations are respectively rotatably connected to link engagement portions 68 formed on a base side (front side) of the right-and-left leg-like portions 64 of the cup retaining member 60 with link connecting portions 52A formed in one end, and are rotatably connected to the bearing portions 42 on right-and-left front sides with link connecting portions 52B formed in the other end.

The back-side link member 54 in a center location is rotatably connected to a link engagement portion 70 formed on an end side of the leg-like portion 66 in a center of the cup retaining member 60 with a link connecting portion 54A formed in one end, and is rotatably connected to the bearing portion 44 in the center with a link connecting portion 54B formed in the other end.

All of rotations of each connecting portion of the front-side link members 52 and the back-side link member 54 extend in the right-and-left direction, and rotate around the axis line parallel to the above-mentioned central axis line X. Thereby, both rotating faces of the front-side link members 52 and the back-side link member 54 are a plane surface perpendicular to the central axis line X. However, the rotating faces of the front-side link members 52 and the back-side link member 54 are located in a position which mutually differs in an axis line direction (right-and-left direction) of the central axis line X.

As mentioned above, the parallel link mechanism 50 connects the case main body 12 and the cup retaining member 60, and retains the cup retaining member 60 so that the cup retaining member 60 can move in parallel between a descent position (housed position) wherein the cup retaining member 60 has been sunk inside the housing chamber 16 and an ascent position (pop-up usage position) on an upper side of the opening portion 14. Thereby, the cup retaining member 60 moves in parallel between the descent position and the ascent position while retaining a horizontal posture.

In back side portions (portions of back sides of the link engagement portions 68) of outside surfaces of the right-and-left leg-like portions 64 of the cup retaining member 60, long groove portions 74 which are long in a horizontal direction are formed by oval loop projections 72. On inside surfaces of the right-and-left side plate portions 24 of the lid member 20, connecting pin portions (convex portions) 25 are integrally formed. The connecting pin portions 25 are slidably engaged with the long groove portions 74, and connect the lid member 20 and the cup retaining member 60 so as to be capable of interconnecting.

Connecting mechanisms interconnecting the lid member 20 and the cup retaining member 60 are structured by the above-mentioned connecting pin portions 25 and the long groove portions 74. Due to a movement of the lid member 20 from the closed position to the open position, the cup retaining member 60 moves upward from the descent position to the ascent position, and due to a movement of the lid member 20 from the open position to the closed position, the cup retaining member 60 moves downwardly from the ascent position to the descent position.

In the embodiment, locations of the parallel link mechanism 50 and the connecting mechanisms by the connecting pin portions 25 and the long groove portions 74 never overlap position-wise so as to provide an advantage space-wide, so that an assembly operation never becomes troublesome.

On an inside surface (a face on a cup retaining member 60 side of the lid member 20 which is in the open position) of the lid main portion 22 of the lid member 20, two brackets 80 are protruded in the right-and-left direction. In the brackets 80, tongue-shaped auxiliary cup retaining members 82 are respectively attached so as to be capable of rotating around the axis line extending in the right-and-left direction by fitting axis portions 84 formed in the auxiliary cup retaining members 82, and bearing holes 86 formed in the brackets 80.

Figure 5:
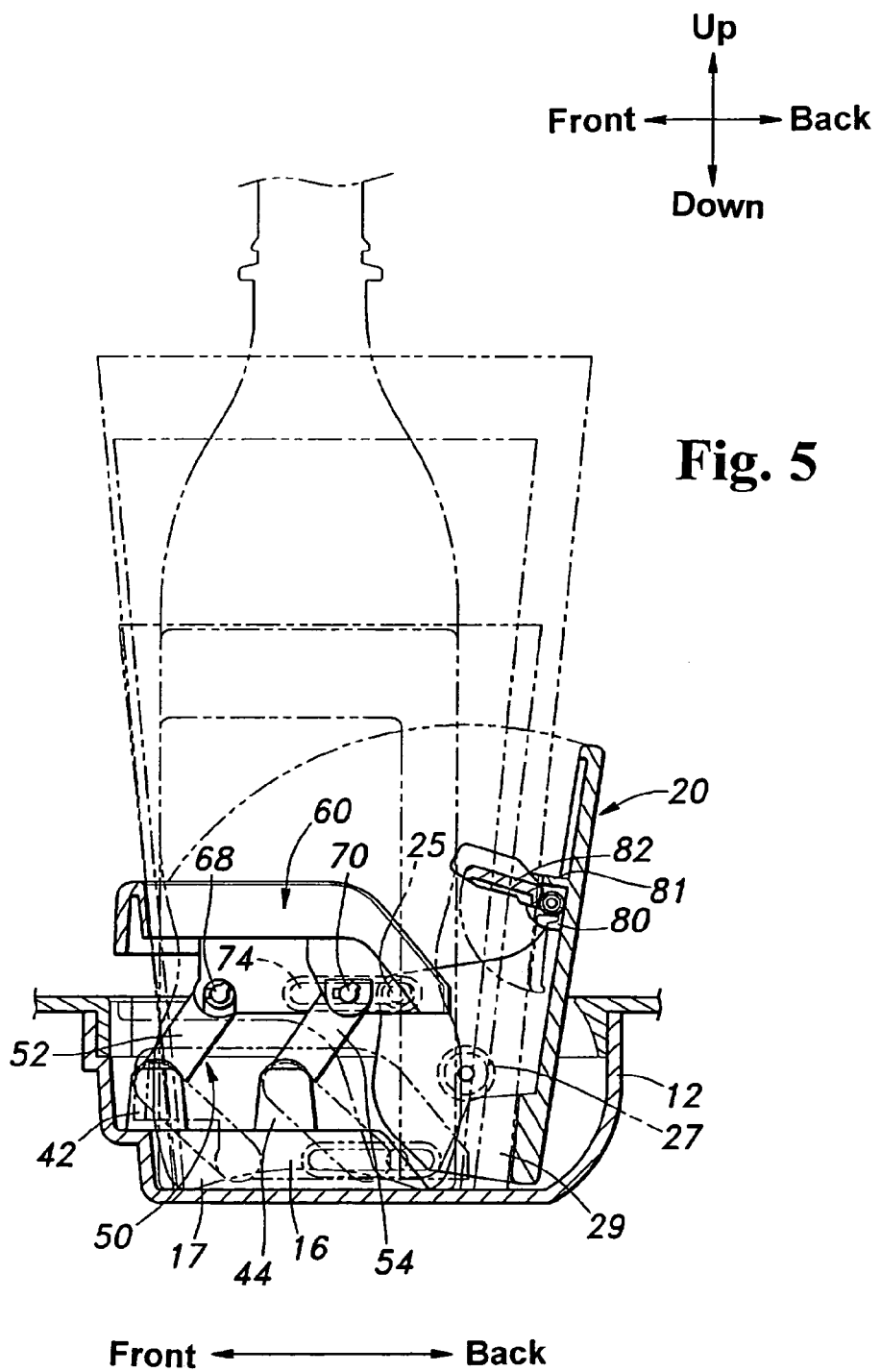
FIG. 5 is a cross-sectional view of the usage state of the cup holder according to the present embodiment.

The right-and-left auxiliary cup retaining members 82 are located in a position which fits together with the cup-retaining shape portions 62 per each cup-retaining shape portion 62 of the cup retaining member 60. As shown in FIG. 5, due to a spring force of a metallic twisting coil spring 88, the right-and-left auxiliary cup retaining members 82 are respectively urged in an up-and-down direction individually so as to abut against stopper portions 81 of the brackets 80. Accordingly, under a state wherein the lid member 20 is in the open position, the right-and-left auxiliary cup retaining members 82 retain an approximately horizontal posture, and due to a downward external force, the right-and-left auxiliary cup retaining members 82 are rotated and displaced downwardly against the spring force of the twisting coil spring 88.

As shown in FIG. 5, when a cup or a plastic bottle is inserted into the cup-retaining shape portion 62, according to a bore diameter of the cup or the plastic bottle, the auxiliary cup retaining member 82 is pushed downwardly against the spring force of the twisting coil spring 88. Thereby, even in a case of the cup or the plastic bottle with a relatively large bore, or the cup or the plastic bottle with a relatively small bore, the auxiliary cup retaining member 82 is pressed against an external surface of the cup or the plastic bottle so as to assist stable retention of the cup or the plastic bottle which has been inserted into the cup-retaining shape portion 62. Thereby, although the cup retaining member 60 is easily twisted and deformed since the cup retaining member 60 has a shape including the cup-retaining shape portion 62, the cup retaining member 60 can stably retain the cup and the plastic bottle with large and small various sizes.

Also, on the bottom portion of the case main body 12 and a downside (downside in the open position) of the lid member 20, semicircular cup-retaining shape portions 17, 29 in a plan view are respectively formed per each cup-retaining shape portion 62 so as to assist the stable retention of the cup or the plastic bottle which has been inserted into the cup-retaining shape portion 62 as well.

Along a border portion of the right-and-left leg-like portions 64 of the lid member 20, more specifically, along the border portion which is located in an upper side at a time of the state wherein the lid member 20 is in the open position, stopper abutting portions 27 on a lid member 20 side are protruded toward an inside. Back end sides of the loop projections 72 form stopper abutting portions 73 on the cup retaining member 60 side which can abut against the stopper abutting portions 27.

Figure 6A:
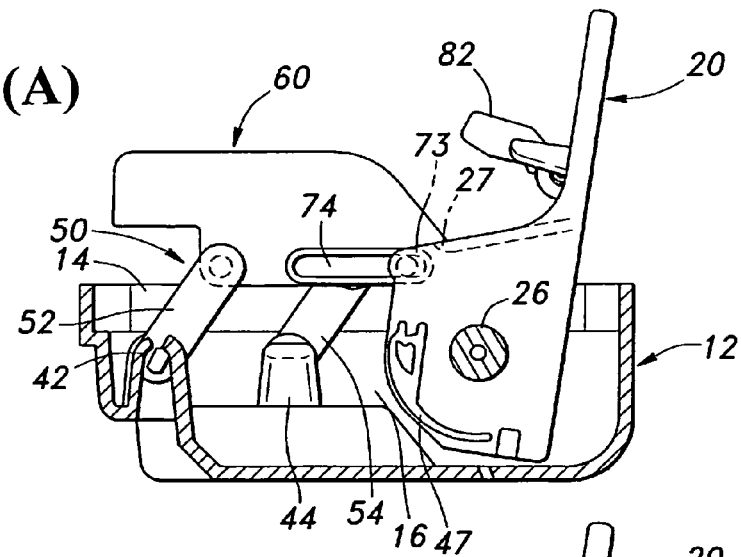
FIGS. 6(A) to 6(C) are cross-sectional views showing each state of the cup holder according to the present embodiment.
Figure 6B:
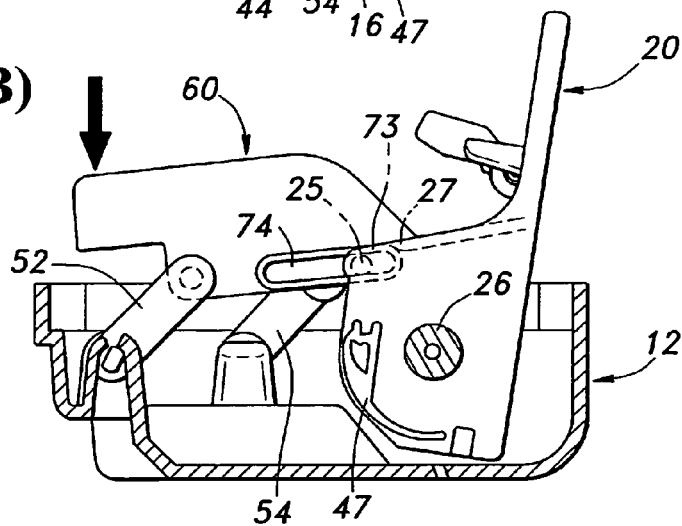

In the state wherein the lid member 20 is in the open position, a front side portion of the cup retaining member 60 is pushed downwardly, and as shown in FIG. 6(B), when the front side portion of the cup retaining member 60 slightly descends in such a way as to "bow down" due to a twisting deformation of the cup retaining member 60, the stopper abutting portions 73 abut against the stopper abutting portions 27 of the lid member 20 from the downside.

Figure 6C:
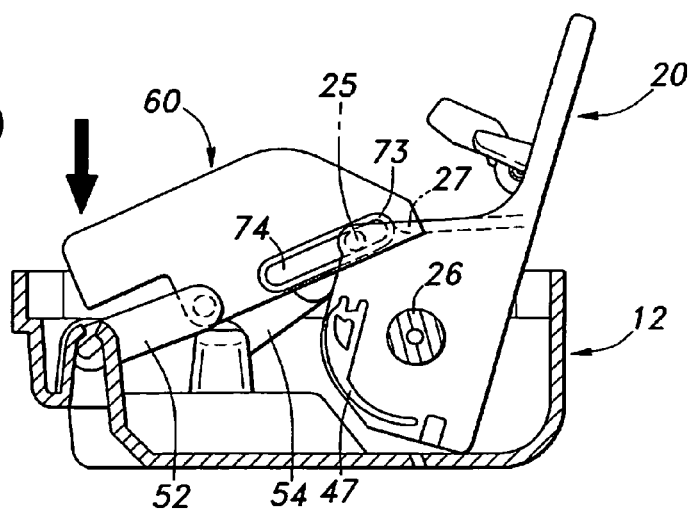

In a structure of the stopper portions, due to a size and a positional setting of each portion, in a case when a pushing-down load acting on the cup retaining member 60 has less than a predetermined value, the stopper abutting portions 73 retain a state abutting against the stopper abutting portions 27 so as to control a further downward movement of the cup retaining member 60. On the other hand, in a case when the pushing-down load acting on the cup retaining member 60 has the predetermined value or above, as shown in FIG. 6(C), the stopper abutting portions 73 climb over the stopper abutting portions 27 while the stopper abutting portions 73 are pushing down the lid member 20 backward, and are disengaged from an abutting state (abutting state shown in FIG. 6(B)) which controls the downward movement of the cup retaining member 60.

Next, an operation of the cup holder 10 according to the above-mentioned structure will be explained.

As shown in FIG. 1, in a housed state wherein the lid member 20 is in the closed position, when a front side of the lid member 20 is pushed in an arrow direction, the lock mechanism 48 is released, and the lid member 20 rotates in the clockwise direction viewed in FIG. 1 as a rotating axis line of the central axis line X by a spring force of the twisting coil spring 32 under the damper operation by the rotary damper 38, and the lid member 20 is positioned in the open position shown in FIG. 2. The cup retaining member 60 moves from the descent position to the ascent position by following the movement of the lid member 20. Thereby, the cup holder 10 receives the cup, plastic bottle, or the like in each cup-retaining shape portion 62 of the cup retaining member 60 so as to become a state retaining the cup, plastic bottle, or the like. In this manner, only by releasing the lock mechanism 48, due to the spring force of the twisting coil spring 32, the lid member 20 is located in the open position, so that usability and operability are excellent.

In the state wherein the lid member 20 is in the open position, when a base portion (front side) of one of the leg-like portions 64 of the cup retaining member 60 which is in the ascent position is touched by a hand, or hit by the cup or the like, a pushing-down load acts on the cup retaining member 60. Due to a structure of the parallel link mechanism 50 of the present embodiment wherein the front and back link members are provided in different streaks in an axis direction, when the pushing-down load acts on the cup retaining member 60, the cup retaining member 60 is relatively easily twisted as a twisting axis line of the right-and-left direction so as to be deformed, and due to the twisting deformation, right-and-left end portions of the cup retaining member 60 descend in such a way as to "bow down" as shown in FIG. 6(B) so as to be displaced.

Thus, when the front side portion of the cup retaining member 60 slightly descends in such a way as to "bow down", the stopper abutting portions 73 of the cup retaining member 60 abut against the stopper abutting portions 27 of the lid member 20 from the downside. When the pushing-down load acting on the cup retaining member 60 has less than the predetermined value, i.e., even if a hand or an object slightly hits the cup retaining member 60, as shown in FIG. 6(B), the stopper abutting portions 73 retain the state abutting against the stopper abutting portions 27 so as to control the further downward movement of the cup retaining member 60.

Thereby, the cup retaining member 60 never wobbles, and cup retention by the cup retaining member 60 never becomes unstable, so that a state of stable cup retention with high merchantability is retained.

On the other hand, when the pushing-down load acting on the cup retaining member 60 has the predetermined value or above since a hand or an object strongly hit the cup retaining member 60 and the like, as shown in FIG. 6(C), the stopper abutting portions 73 climb over the stopper abutting portions 27 while the stopper abutting portions 73 are pushing down the lid member 20 backward, and are disengaged from the abutting state (abutting state shown in FIG. 6(B)) which controls the downward movement of the cup retaining member 60.

Thereby, the cup retaining member 60 is allowed to move downwardly so as to prevent an excessive load from acting on the cup retaining member 60, so that damage on the cup retaining member 60 due to the excessive load is prevented.

After the usage of the cup holder 10, in order to house the cup retaining member 60 inside the housing chamber 16 of the case main body 12, the standing lid member 20 is rotated around the central axis line X approximately 90 degrees in a counterclockwise direction viewed in FIG. 2 by hand against the spring force of the twisting coil spring 32, and as shown in FIG. 1, the lid member 20 is returned to the original closed position. When the lid member 20 is returned to the closed position, due to the lock mechanism 48, the lid member 20 is retained in the closed position.

In a process in which the lid member 20 is moved from the closed position to the open position by the spring force of the twisting coil spring 32, and at a usual operational time when the lid member 20 is returned to the closed position from the open position against the spring force of the twisting coil spring 32 by pushing the lid member 20, as shown in FIG. 6(A), the stopper abutting portions 27 of the lid member 20 and the stopper abutting portions 73 of the cup retaining member 60 are distantly positioned so as not to be abutted, so that opening and closing operations thereof are never inhibited.

The cup holder according to the present invention is not limited to the above-mentioned embodiment, and can be modified to various embodiments provided that they do not exceed the subject of the present invention. For example, it is not essential to provide the stopper abutting portions 27 in the border portion of the lid member 20 in a streaky shape, or to structure the stopper abutting portions 73 by one portion of the loop projections 72. The stopper abutting portions 27 and the stopper abutting portions 73 may have any structures provided that they are provided in the lid member 20 and the cup retaining member 60; and in the case when the pushing-down load acting on the cup retaining member 60 has less than the predetermined value, the stopper abutting portions 73 retain the state abutting against the stopper abutting portions 27; and in the case when the pushing-down load acting on the cup retaining member 60 has the predetermined value or above, the stopper abutting portions 73 are disengaged from the abutting state which controls the downward movement of the cup retaining member 60.

Also, the parallel link mechanism 50 is not limited to the embodiment in which the front and back link members are provided in the different streaks in the axis direction, and may be the most usual parallel link mechanism provided in a position same as the front and back link members or in the axis direction.

While the invention has been explained with reference to the specific embodiments of the invention, the explanation is illustrative and the invention is limited only by the appended claims.

What is claimed is:

1. A cup holder, comprising:
   a case main body defining a housing chamber including an opening portion on an upper side;
   a lid member rotatably attached to the case main body between a closed position closing the opening portion and an open position opening the opening portion;
   a cup retaining member including a cup-retaining shape portion;
   a parallel link mechanism connecting the case main body and the cup retaining member, and movably retaining the cup retaining member between a descent position inside the housing chamber and an ascent position on an upper side of the opening portion;
   a connecting mechanism connecting the lid member and the cup retaining member so as to be capable of interconnecting together so that the cup retaining member ascends and moves to the ascent position from the descent position by a movement of the lid member from the closed position to the open position, and the cup retaining member descends and moves from the ascent position to the descent position by a movement of the lid member from the open position to the closed position; and
   stopper abutting portions provided in the cup retaining member and the lid member, controlling a downward movement of the cup retaining, member by mutually abutting in a case when a pushing-down load acting on the cup retaining member has less than a predetermined value in a state wherein the lid member is in the open position, and allowing the downward movement of the cup retaining member by being disengaged from an abutting state which controls the downward movement in a case when the pushing-down load has the predetermined value or above in the state wherein the lid member is in the open position,
   wherein the parallel link mechanism comprises a right-and-left pair of first link members, each having one end connected to one side portion of the cup retaining member so as to be capable of rotating around an axis line extending in a right-and-left direction, and another end rotatably connected to the case main body; and
   a second link member with a length equal to a length of one of the first link members, having one end connected to an intermediate portion of the cup retaining member in the right-and-left direction in a position which differs in a front-back direction from a connecting position between the cup retaining member and the first link members so as to be capable of rotating around the axis line extending in the right-and-left direction, and another end rotatably connected to the case main body.

2. A cup holder according to claim 1, wherein in the open position, the lid member stands up at a back of the cup retaining member,
   the first link members are connected to the cup retaining member in a front side portion of the cup retaining member,
   the second link member is connected to the cup retaining member in a back side portion of the cup retaining member, and the connecting mechanism comprises elongated groove portions extending in a horizontal direction and respectively provided on the back side portion on both right and left sides of the cup retaining member, and convex portions which are respectively provided on both right and left sides of the lid member, and slidably engaged with the elongated groove portions.

3. A cup holder according to claim 2, wherein the cup-retaining shape portion of the cup retaining member has a semicircular shape in which a standing side of the lid member is open, and further comprising an auxiliary cup retaining member provided on a front face of the lid member in a standing state so as to be capable of rotating in an up-and-down direction, protruding to a cup-retaining shape portion side by being urged by a spring in an upper direction, and configured to be pushed down against urging of the spring by a cup inserted into the cup-retaining shape portion.

* * * * *